(12) United States Patent
Loeffelholz et al.

(10) Patent No.: US 11,156,793 B2
(45) Date of Patent: Oct. 26, 2021

(54) FACILITATING INSTALLATION OF FIBER OPTIC NETWORKS

(71) Applicant: CommScope Techologies LLC, Hickory, NC (US)

(72) Inventors: Todd Loeffelholz, Bellingham, WA (US); Timothy G. Badar, Redwood City, CA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/822,337

(22) Filed: Mar. 18, 2020

(65) Prior Publication Data

US 2020/0285015 A1 Sep. 10, 2020

Related U.S. Application Data

(60) Continuation of application No. 16/259,594, filed on Jan. 28, 2019, now Pat. No. 10,598,887, which is a division of application No. 15/840,662, filed on Dec. 13, 2017, now abandoned, which is a continuation of application No. 14/876,140, filed on Oct. 6, 2015, now Pat. No. 9,851,525.

(60) Provisional application No. 62/060,289, filed on Oct. 6, 2014.

(51) Int. Cl.
*G02B 6/44* (2006.01)
*G02B 6/46* (2006.01)

(52) U.S. Cl.
CPC .............. *G02B 6/447* (2013.01); *G02B 6/46* (2013.01)

(58) Field of Classification Search
CPC . G02B 6/4471; G02B 6/46; G02B 2006/1215
See application file for complete search history.

(56) References Cited

U.S. PATENT DOCUMENTS

| 4,630,886 | A | 12/1986 | Lauriello |
| 5,204,921 | A | 4/1993 | Kanai et al. |
| 5,321,541 | A | 6/1994 | Cohen |
| 5,539,564 | A | 7/1996 | Kumozaki |
| 6,256,443 | B1 | 7/2001 | Uruno et al. |
| 6,351,582 | B1 | 2/2002 | Dyke et al. |

(Continued)

FOREIGN PATENT DOCUMENTS

| EP | 1 746 858 A1 | 1/2007 |
| EP | 2 313 998 B1 | 9/2012 |

(Continued)

OTHER PUBLICATIONS

Certified English Translation of FR 2 914 753, which published Oct. 2008.

(Continued)

*Primary Examiner* — Daniel Petkovsek
(74) *Attorney, Agent, or Firm* — Merchant & Gould P.C.

(57) ABSTRACT

A cable arrangement includes first and second optical fiber ribbons both having first ends terminated at a first multi-fiber optical connector. The first ribbon includes a drop fiber routed to a drop interface and indexed fibers having ends indexed at a first row of a second multi-fiber connector. The second ribbon includes fibers having ends terminated at the second multi-fiber connector (e.g., at a second row of the second multi-fiber connector).

20 Claims, 2 Drawing Sheets

(56) References Cited

U.S. PATENT DOCUMENTS

| | | |
|---|---|---|
| 6,694,083 B2 * | 2/2004 | Paradiso ............ B60R 16/0207 385/100 |
| 6,983,095 B2 | 1/2006 | Reagan et al. |
| 7,198,409 B2 | 4/2007 | Smith et al. |
| 7,200,317 B2 | 4/2007 | Reagan et al. |
| 7,218,827 B2 | 5/2007 | Vongseng et al. |
| 7,233,731 B2 | 6/2007 | Solheid et al. |
| 7,277,620 B2 | 10/2007 | Vongseng et al. |
| 7,369,741 B2 | 5/2008 | Reagan et al. |
| 7,400,816 B2 | 7/2008 | Reagan et al. |
| 7,407,330 B2 | 8/2008 | Smith et al. |
| 7,418,181 B2 | 8/2008 | Zimmel |
| 7,444,056 B2 | 10/2008 | Allen et al. |
| 7,457,503 B2 | 11/2008 | Solheid et al. |
| 7,471,869 B2 | 12/2008 | Reagan et al. |
| 7,515,805 B2 | 4/2009 | Vongseng et al. |
| 7,519,259 B2 | 4/2009 | Smith et al. |
| 7,546,018 B2 | 6/2009 | Hendrickson et al. |
| 7,606,459 B2 | 10/2009 | Zimmel |
| 7,668,425 B1 | 2/2010 | Elkins, II |
| 7,756,371 B1 * | 7/2010 | Burnham ............ G02B 6/3897 385/51 |
| 7,809,232 B2 | 10/2010 | Reagan et al. |
| 7,809,233 B2 | 10/2010 | Smith et al. |
| 7,809,234 B2 | 10/2010 | Smith et al. |
| 7,809,235 B2 | 10/2010 | Reagan et al. |
| 7,826,706 B2 | 11/2010 | Vongseng et al. |
| 7,841,775 B2 | 11/2010 | Smith et al. |
| 7,844,159 B2 | 11/2010 | Solheid et al. |
| 7,844,161 B2 | 11/2010 | Reagan et al. |
| 7,853,112 B2 | 12/2010 | Zimmel et al. |
| 7,873,255 B2 | 1/2011 | Reagan et al. |
| 7,980,768 B2 | 7/2011 | Smith et al. |
| 7,995,894 B2 | 8/2011 | Solheid et al. |
| 8,184,940 B2 | 5/2012 | Smith et al. |
| 8,210,756 B2 | 7/2012 | Smith et al. |
| 8,249,450 B2 | 8/2012 | Conner |
| 8,285,103 B2 | 10/2012 | Reagan et al. |
| 8,346,045 B2 | 1/2013 | Zimmel et al. |
| 8,374,476 B2 | 2/2013 | Reagan et al. |
| 8,401,357 B2 | 3/2013 | Solheid et al. |
| 9,348,096 B2 | 5/2016 | Kmit et al. |
| 9,851,525 B2 | 12/2017 | Loeffelholz et al. |
| 10,598,887 B2 | 3/2020 | Loeffelholz et al. |
| 2003/0103750 A1 | 6/2003 | Laporte et al. |
| 2005/0105873 A1 | 5/2005 | Reagan et al. |
| 2006/0008231 A1 | 1/2006 | Reagan et al. |
| 2006/0233506 A1 | 10/2006 | Noonan et al. |
| 2006/0269208 A1 | 11/2006 | Allen et al. |
| 2007/0031100 A1 | 2/2007 | Garcia et al. |
| 2007/0195693 A1 | 8/2007 | Li |
| 2007/0274720 A1 | 11/2007 | Menasco, Jr. et al. |
| 2008/0025725 A1 | 1/2008 | Jette et al. |
| 2008/0285916 A1 | 11/2008 | Sappey et al. |
| 2008/0317468 A1 | 12/2008 | Villarruel et al. |
| 2009/0041457 A1 | 2/2009 | Maki et al. |
| 2009/0294016 A1 | 12/2009 | Sayres et al. |
| 2009/0317047 A1 | 12/2009 | Smith et al. |
| 2010/0092129 A1 * | 4/2010 | Conner ................ G02B 6/4452 385/17 |
| 2010/0092133 A1 | 4/2010 | Conner |
| 2010/0092146 A1 | 4/2010 | Conner et al. |
| 2010/0092169 A1 | 4/2010 | Conner et al. |
| 2010/0092171 A1 | 4/2010 | Conner |
| 2010/0098407 A1 | 4/2010 | Goswami et al. |
| 2010/0142888 A1 | 6/2010 | Graff et al. |
| 2010/0226654 A1 | 9/2010 | Smith et al. |
| 2010/0303408 A1 | 12/2010 | Conner et al. |
| 2010/0329624 A1 | 12/2010 | Zhou et al. |
| 2011/0026894 A1 | 2/2011 | Rudenick et al. |
| 2011/0058785 A1 | 3/2011 | Solheid et al. |
| 2011/0091170 A1 | 4/2011 | Bran de Leon et al. |
| 2011/0097052 A1 | 4/2011 | Solheid et al. |
| 2011/0129226 A1 | 6/2011 | Vleugels et al. |
| 2011/0135307 A1 | 6/2011 | Conner et al. |
| 2011/0158598 A1 | 6/2011 | LeBlanc et al. |
| 2011/0222831 A1 | 9/2011 | Cao et al. |
| 2011/0274403 A1 | 11/2011 | LeBlanc et al. |
| 2011/0293277 A1 | 12/2011 | Bradea et al. |
| 2012/0027355 A1 | 2/2012 | LeBlanc et al. |
| 2012/0189259 A1 * | 7/2012 | Manes ................ G02B 6/4452 385/135 |
| 2012/0321309 A1 | 12/2012 | Barry et al. |
| 2012/0328294 A1 | 12/2012 | Chen |
| 2013/0028566 A1 | 1/2013 | Smith et al. |
| 2013/0064510 A1 | 3/2013 | Smith et al. |
| 2013/0114937 A1 | 5/2013 | Zimmel et al. |
| 2013/0163984 A1 | 6/2013 | Kelly et al. |
| 2013/0216187 A1 | 8/2013 | Dowling |
| 2014/0105539 A1 | 4/2014 | Conner |
| 2014/0199079 A1 | 7/2014 | Smith et al. |
| 2014/0226939 A1 | 8/2014 | Boxer et al. |
| 2014/0254986 A1 * | 9/2014 | Kmit ..................... H04B 10/27 385/55 |
| 2015/0378112 A1 | 12/2015 | Marcouiller et al. |

FOREIGN PATENT DOCUMENTS

| | | |
|---|---|---|
| FR | 2 914 753 A1 | 10/2008 |
| JP | 10-32545 | 2/1998 |
| JP | 2009-38650 | 2/2009 |
| JP | 2009-86464 | 4/2009 |
| KR | 10-2009-0114191 | 11/2009 |
| WO | WO 2005/117300 A1 | 12/2005 |
| WO | WO 2008/079329 A2 | 7/2008 |
| WO | WO 2010/093794 A1 | 8/2010 |
| WO | WO 2011/130472 A2 | 10/2011 |

OTHER PUBLICATIONS

European Search Report for Application No. 12860025.1 dated Jun. 26, 2015.

European Search Report for Application No. 13767640.9 dated Oct. 21, 2015.

Extended European Search Report for Application No. 15849281.9 dated May 28, 2018.

International Search Report and Written Opinion for PCT/US2012/070299 dated Apr. 23, 2013.

International Search Report for International Application No. PCT/US2013/034618 dated Jul. 26, 2013 (3 pages).

International Search Report and Written Opinion for PCT/US2014/039377 dated Oct. 22, 2014.

International Search Report and Written Opinion for Application No. PCT/US2015/054038 dated Jan. 21, 2016.

* cited by examiner

FACILITATING INSTALLATION OF FIBER OPTIC NETWORKS

CROSS REFERENCE TO RELATED APPLICATIONS

This application is a continuation of application Ser. No. 16/259,594, filed Jan. 28, 2019, now U.S. Pat. No. 10,598, 887, which is a divisional of application Ser. No. 15/840, 662, filed Dec. 13, 2017, now abandoned, which is a continuation of application Ser. No. 14/876,140, filed Oct. 6, 2015, now U.S. Pat. No. 9,851,525, which application claims the benefit of provisional application Ser. No. 62/060, 289, filed Oct. 6, 2014, and titled "Facilitating Installation of Fiber Optic Networks," which applications are incorporated herein by reference in their entirety.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

SUMMARY

In accordance with other aspects of the disclosure, an optical network includes an optical cable arrangement including a plurality of optical fibers that define first optical lines that are indexed in a first indexing direction along the optical cable arrangement; an indexing terminal disposed at an intermediate location along the optical cable arrangement; and a splitter terminal disposed external of the indexing terminal. At least one of the first optical lines drops off at the indexing terminal. An output cable defines a drop line that optically couples the first optical line that dropped off at the indexing terminal to an input of an optical splitter at the splitter terminal.

In certain examples, the indexing terminal includes a first port, a second port, and a third port. The first optical lines of the optical cable arrangement are indexed at the second port. The first optical line that drops off is routed to the third port. In certain examples, the splitter terminal defines a network output port and a subscriber output port. The optical splitter has first outputs directed to the network output port and an additional output directed to the subscriber output port.

In certain examples, the optical fibers of the optical cable arrangement also define second optical lines that are indexed in a second indexing direction along the optical cable arrangement. The second indexing direction is different from the first indexing direction. At least one of the second optical lines drops off at the indexing terminal. In an example, the output cable defines a second drop line that optically couples the second optical line that dropped off at the indexing terminal to the input of the optical splitter at the splitter terminal.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the specification, illustrate several aspects of the present disclosure and together with the description, serve to explain the principles of the disclosure. A brief description of the drawings is as follows.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
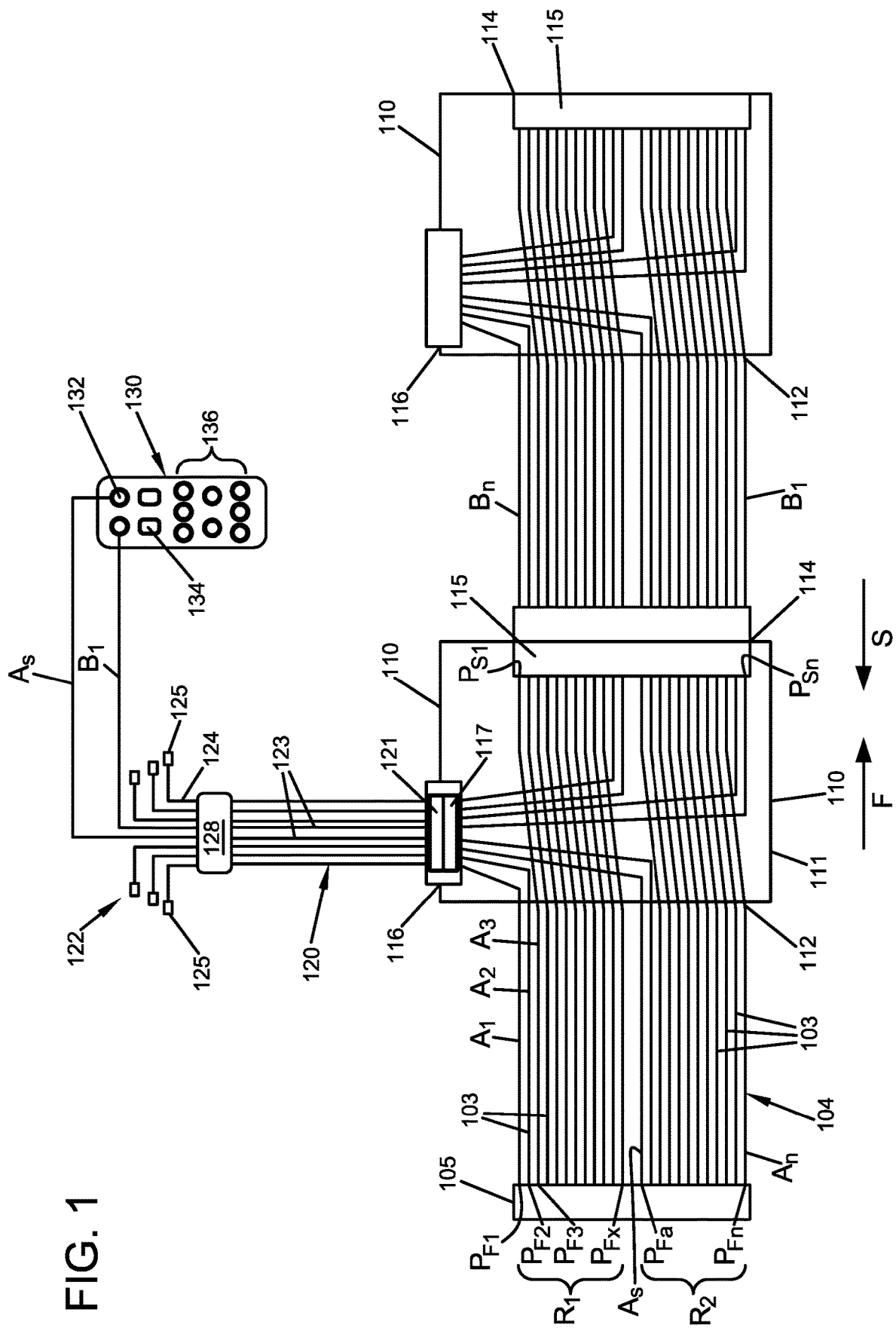
FIG. 1 is a schematic diagram of an example network including bidirectional indexing terminals and separate splitter terminals.

FIG. 1 illustrates a fiber optic network 100 including an optical cable arrangement 102 having optical fibers 103 that define first optical lines $A_1$-An. In certain examples, the cable arrangement 102 includes between two and forty-eight optical fibers 103. In certain examples, the cable arrangement 102 includes between eight and sixteen optical fibers 103. In certain examples, the cable arrangement 102 includes between sixteen and thirty-two optical fibers 103. In certain examples, the cable arrangement 102 includes between twelve and twenty-four optical fibers 103. In an example, the cable arrangement 102 includes twenty-four optical fibers 103. However, cables arrangements 102 with even larger fiber counts are contemplated.

One or more indexing terminals 110 are disposed along the optical cable arrangement 102. In certain implementations, multiple indexing terminals 110 are daisy chained together using the cable arrangement 102. In certain examples, each indexing terminal 110 is disposed at an intermediate location along the cable arrangement 102. In certain examples, the first optical lines $A_1$-An pass through the indexing terminals 110. The first optical lines $A_1$-An of the optical cable arrangement 102 are indexed at the indexing terminal 110 so that at least one of the first optical lines $A_1$-An drops off at the indexing terminal 110.

The cable arrangement 102 includes one or more multi-fiber cables. Opposite ends of the multi-fiber cables are terminated at optical connectors. In certain implementations, one or both multi-fiber cables can be configured to be ruggedly connected to indexing terminals 110. As the term is used herein, a connection is "ruggedized" when the optical connector and optical adapter are configured to environmentally seal together and are configured to robustly connect together. As the term is used herein, a "robust connection" refers to a connection of an optical connector to an optical adapter such that the optical connector can withstand an axial load of at least 100 pounds without pulling out of the optical adapter. In certain examples, a robust connection structure includes twist-to-lock connections. In an example, a twist-to-lock connection includes a bayonet connection. In another example, a twist-to-lock connection includes a threaded connection. Some non-limiting example ruggedized optical connector interfaces suitable for use with an indexing terminal are disclosed in U.S. Pat. Nos. 7,744,288, 7,762,726, 7,744,286, 7,942,510, and 7,959,361, the disclosures of which are hereby incorporated herein by reference.

In some implementations, the cable arrangement 102 includes multiple multi-fiber cables 104 terminated at a first end by a first optical connector 105 and terminated at a second end by a second optical connector 115. In examples, the first optical connector 105 is a ruggedized optical connector. The optical fibers 103 are disposed at the first optical connector 105 in sequential positions. The optical fibers 103 are also disposed at the second optical connector 115 in sequential positions. In some implementations, the optical fibers 103 are loose within the cables 104. In other implementations, the optical fibers 103 are arranged in fiber ribbons.

The first optical lines $A_1$-An are indexed in a first indexing direction F along the optical cable arrangement 102. For example, one or more of the first optical lines $A_1$-An progressively drops off at various indexing locations (e.g., indexing terminals 110) along the cable arrangement 102. In the example shown, the optical fibers 103 of each fiber ribbon R1, R2 are disposed at the first optical connector 105 in sequential positions $P_{F1}$-$P_{FN}$, $P_{S1}$-$P_{SN}$, respectively. In some implementations, the first optical lines $A_1$-An are indexed in the first direction F by dropping off at least the first optical line $A_1$ at the first sequential position $P_{F1}$ of the first optical connector 105. A first optical line $A_2$ extending from a second sequential position $P_{F2}$ at the first optical connector 105 also drops off at the indexing terminal 110. The remaining first optical lines extend from the first optical connector 105 to the first available position in sequence at the second connector 115 beginning with the first optical line $A_3$ extending from a third sequential position $P_{F3}$ at the first optical connector 105 to a first sequential position Psi at the second optical connector 115.

In some implementations, the sequential positions at the connectors 105, 115 are disposed in one or more rows R1, R2. For example, the first optical connector 105 can include a first row R1 of sequential positions $P_{F1}$-$P_{FX}$ and a second row R1 of sequential positions $P_{F4}$-$P_{FN}$. In certain implementations, each row R1, R2 of positions is separately indexed. Indexing the ribbons R1, R2 separately avoids the need to cross-index the optical fibers between the ribbons R1, R2.

Accordingly, first optical lines extending from the first sequential position $P_{F1}$, $P_{F4}$ of each row R1, R2 can drop off at the indexing terminal 110 while a first optical lines extending from subsequent sequential positions (e.g., the third sequential positions) can be routed to the first available position in sequence at a corresponding row on the second optical connector 115. If an optical fiber 103 extends from one of the positions in a first row R1 at the first optical connector 105, then the optical fiber 103 will extend to one of the positions in the first row at the second optical connector 115 and will not extend to a different row at the second connector 115.

In other implementations, the first optical lines can be dropped off in any desired configuration. For example, the first optical lines could be indexed non-sequentially or sequentially starting with the last sequential position. In still other examples, a greater or lesser number of first optical lines can drop off at the indexing terminal 110.

The example indexing terminals 110 shown in FIG. 1 includes a closure 111 defining a first cable port 112, a second cable port 114, and a third cable port 116. The first optical lines $A_1$-An of the optical cable arrangement 102 pass through the first cable port 112 and are indexed at the second cable port 114. A first optical line that drops off at the indexing terminal 110 is routed to the third cable port (i.e., drop port) 116. In certain examples, multiple first optical lines drop off at the indexing terminal 110. In some such examples, the first optical lines that drop off are routed to the third cable port 116. In other such examples, the first optical lines that drop off are routed to multiple drop ports including the third cable port 116.

In some implementations, each indexing terminal 110 is associated with one of the multi-fiber cables 104 of the cable arrangement 102. In certain examples, the cable 104 is pre-cabled within the indexing terminal 110 at a factory prior to installation in the field. In certain implementations, the first optical connector 105 of the cable 104 is disposed external of the indexing terminal 110 and the second optical connector 115 of the cable 104 is disposed internal of the indexing terminal 110. For example, the cable 104 can extend into the closure 111 through a sealed pass-through port 112 and the second connector 115 can be received at the second cable port 114. In an example, the second connector 115 can be received at a ruggedized external port of a ruggedized optical adapter. In an example, the internal port of the optical adapter is non-ruggedized.

As the term is used herein, an optical adapter is "ruggedized" when at least one port of the optical adapter is configured to provide a ruggedized connection to an optical connector received at the port. If a ruggedized optical adapter is carried by a closure, then the ruggedized optical adapter will be environmentally sealed (e.g., using a gasket) to the closure. In some examples, a ruggedized port can include a seal (e.g., a gasket) disposed therein to press against an optical connector received in the port. In other examples, the ruggedized port can include a wall or other structure against which a seal on a connector may press when the connector is received at the port. Examples of non-ruggedized ports include ports configured to receive standard single fiber connectors (e.g., SC plugs, SC adapters, LC plugs, LC adapters, ST plugs, ST adapters, etc.) or standard multi-fiber connectors (e.g., MPO plugs and/or MPO adapters).

The cable 104 extends out of the closure 111 a sufficient distance so that the first optical connector 105 can be received at the second cable port 114 (e.g., at a ruggedized external port of an optical adapter) of another indexing terminal 110 or other equipment. In other implementations, optical adapters can be disposed at both the first and second cable ports 112, 114 of each indexing terminal 110. Internal cabling within each indexing terminal 110 connects the first, second, and third cable ports 112, 114, 116 of the indexing terminal 110. In such implementations, non-indexed multi-fiber cables can be routed to the first and second cable ports 112, 114.

In accordance with some aspects of the disclosure, the network 100 has a bidirectional indexing architecture. For example, the optical fibers 103 of the optical cable arrangement 102 also can define second optical lines $B_1$-Bn that are indexed in a second indexing direction S along the optical cable arrangement 102. The second indexing direction S is different from the first indexing direction F. In an example, the directions F and S are opposites. At least one of the second optical lines $B_1$-Bn drops off at each indexing terminal 110. In some examples, the first optical lines A1-A12 and the second optical lines B1-B12 extend to a common location, such as a central office. For example, each end of the optical cable arrangement 102 can be received at a central office (e.g., the same central office or a different central office). In this way, the optical fiber lines A1-A12 and the optical fiber lines B1-B12 cooperate to form a fiber loop. In other examples, the first and second fibers can be routed to different locations.

In some implementations, the second optical lines $B_1$-Bn are indexed in the second direction S by dropping off at least the second optical line at the last sequential position $P_{SN}$ of the second optical connector 115. In the example shown, a second optical line extending from a penultimate sequential position at the second optical connector 115 also drops off at the indexing terminal 110. A second optical line extending from an antepenultimate sequential position at the second optical connector 115 extends to the last sequential position $P_{FN}$ at the first optical connector 105. In other examples, the second optical lines could be indexed non-sequentially or sequentially starting with the first sequential position. In still other examples, a greater or lesser number of second optical lines can drop off at the indexing terminal 110.

In the example shown, first optical lines extending from the first two sequential positions $P_{F1}$, $P_{F2}$ of a first ribbon R1 at the first optical connector 105, first optical lines extending from the first two sequential positions of a second ribbon R2 at the first optical connector 105, second optical lines extending from the last two sequential positions of the first ribbon R1 at the second optical connector 115, and second optical lines extending from the last two sequential positions of a second ribbon R2 are dropped off at the indexing terminal 110. In other examples, other routing configurations are possible.

In some bidirectional architectures, the indexing terminal 110 is cabled so that the first and second optical lines that drop off at the indexing terminal 110 are routed to a common drop port (e.g., the third cable port 116). In other examples, the first and second optical lines that drop off can be routed to multiple drop ports 116. In an example, the first optical lines that drop off can be routed to one drop port and the second optical lines that drop off can be routed to another drop port. In other examples, each drop port 116 can receive one of the first optical lines that drops off and one of the second optical lines that drops off.

Figure 2:
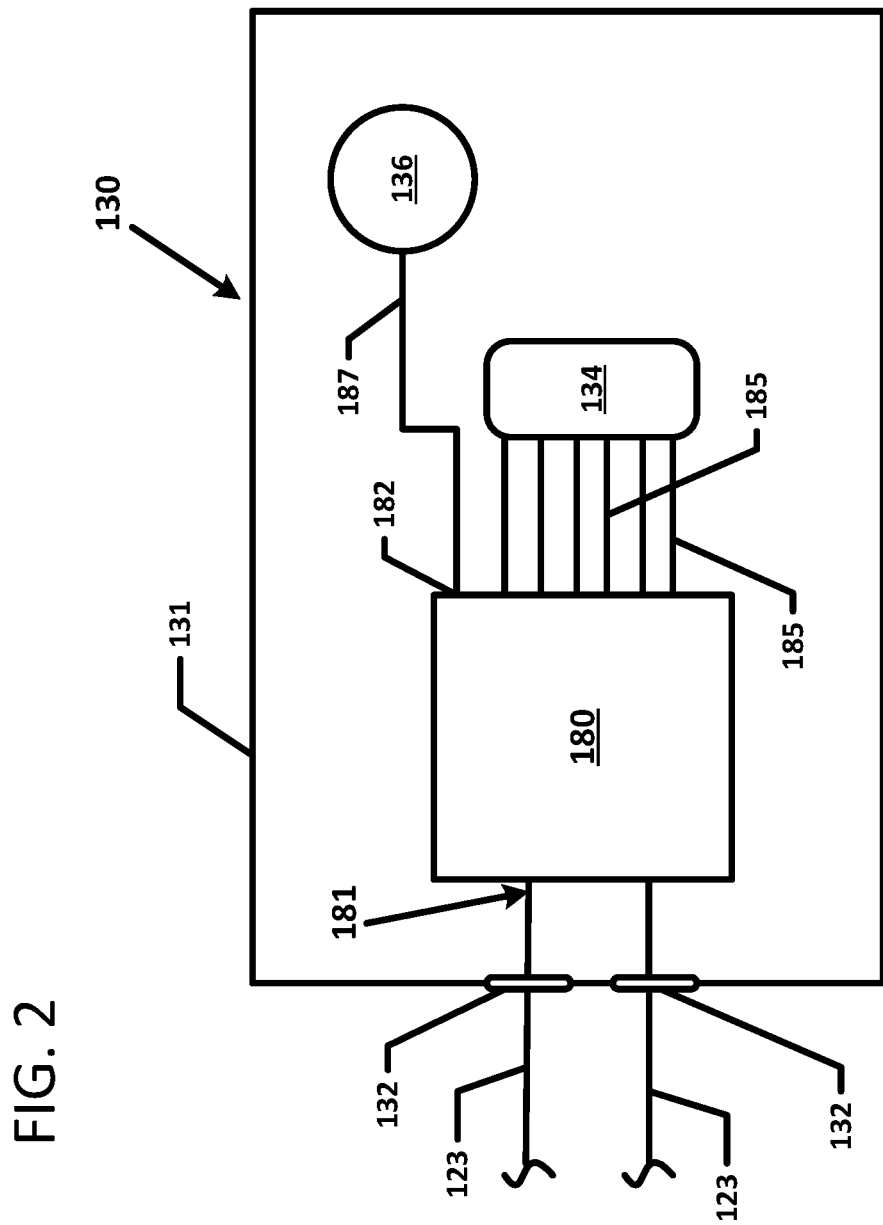
FIG. 2 is a schematic block diagram of a splitter terminal disposed external of the indexing terminals shown in FIG. 1.

A splitter terminal 130 is disposed external of the indexing terminals 110. In certain implementations, each indexing terminal 110 has a corresponding splitter terminal 130. In certain implementations, each indexing terminal 110 may be associated with multiple splitter terminals 130. The splitter terminal 130 includes an enclosure 131 that houses an optical splitter 180 (see FIG. 2). In certain examples, the enclosure 131 can house multiple optical splitters. In various examples, the optical splitter 180 is configured to split (e.g., power split) any optical signal received at the splitter input 181 into multiple (e.g., two, three, four, eight, sixteen, thirty-two, sixty-four, etc.) optical signals that are each output onto a separate optical fiber 185.

An output cable 120 includes an optical fiber 123 that optically couples one of the first optical lines (e.g., first optical line $A_S$) that dropped off at the indexing terminal 110 to an input 181 of the optical splitter 180 at the splitter terminal 130. In some implementations, the output cable 120 also includes an optical fiber 123 that optically couples one of the second optical lines (e.g., second optical line $B_1$) that dropped off at the indexing terminal 110 to a second input 181 of the optical splitter 180 at the splitter terminal 130. Accordingly, the optical splitter 180 receives optical signals carried over the first optical line $A_1$ and optical signals carried over the second optical line $B_1$.

First outputs 185 of the optical splitter 180 are routed to a network output port 134 of the splitter terminal 130. In some examples, the first outputs 185 include optical signals split from the first optical line received at the splitter input 181. In certain examples, the first outputs 185 include optical signals split from the second optical line received at the splitter input 181. In certain examples, the first outputs 185 include optical signals split from the first optical lines and optical signals split from the second optical lines. An additional output 187 of the optical splitter 180 is routed to a subscriber output port 136 of the splitter terminal 130. In some examples, the additional output 187 includes optical signals split from the first optical line received at the splitter input 181. In certain examples, the additional output 187 includes optical signals split from the second optical line received at the splitter input 181. In certain examples, the additional output 187 includes optical signals split from the first optical lines and optical signals split from the second optical lines. In other implementations, however, the splitter terminal 130 may include only one or more network output ports 134 (i.e., multi-fiber output ports). In still other implementations, the splitter terminal 130 may include only one or more subscriber output ports 136 (i.e., single-fiber output ports).

In certain implementations, the subscriber output port 136 of the splitter enclosure 131 is one of multiple subscriber output ports 136 that each receive optical signals output by the optical splitter. In examples, the splitter enclosure 131 defines about two to about sixteen subscriber output ports 136. In examples, the splitter enclosure 131 defines about four to about twelve subscriber output ports 136. In an example, the splitter enclosure 131 defines about six subscriber output ports 136. In an example, the splitter enclosure 131 defines about eight subscriber output ports 136. In other examples, the splitter enclosure 131 can define a greater or lesser number of subscriber output ports 136. In an example, each subscriber output port 136 receives one split line from the optical splitter. Accordingly, a single-fiber cable can be plugged into each subscriber output port 136 at the splitter terminal 130 to receive the optical signals carried over the split line.

In certain implementations, the network output port 134 of the splitter enclosure 131 is one of multiple network output ports 134 that each receive optical signals output by the optical splitter. In an example, the splitter enclosure 131 defines two network output ports 134. In other examples, the splitter enclosure 131 can define a greater or lesser number of network output ports 134. In examples, each network output port 134 receives multiple split lines from the optical splitter. Accordingly, a multi-fiber cable can be plugged into each network output port 134 at the splitter terminal 130 to receive the optical signals carried over the split lines.

The splitter enclosure 131 also defines an input port 132. Signals received at the input port 132 are directed to the input of the optical splitter. In some examples, the input port 132 includes a sealed pass-through at which a portion of the output cable 120 can enter the splitter enclosure 131. In other examples, the input port 132 includes a ruggedized optical adapter having a ruggedized external port. In such an example, a ruggedized optical connector of the output cable 120 can be received at the ruggedized external port so that optical signals carried over the output cable 120 are directed to the splitter input. In an example, the splitter enclosure 131 includes multiple input ports 132.

The output cable 120 extends from a first end 121 to a second end 122. The first end 121 is coupled (e.g., robustly connected) to the third cable port 116 of the first indexing terminal 110. In some implementations, the first end 121 is terminated by an optical connector (e.g., a ruggedized multi-fiber connector) configured to be received at the third cable port 116. For example, the first end 121 can be aligned with a multi-fiber optic connector (e.g., a non-ruggedized connector) 117 that holds the dropped optical lines and that is received at an interior of the third cable port 116. In other implementations, the first end 121 is disposed within the closure 111 and coupled (e.g., spliced) to the first and second optical lines that dropped off at the indexing terminal 110.

At least part of the second end 122 of the output cable 120 is optically coupled to the input of the optical splitter. In an example, the at least part of the second end 122 is disposed within the splitter enclosure 131 so that a portion of the output cable 120 passes through the input port 132 of the splitter enclosure 131. In another example, the at least part of the second end 122 is terminated by an optical connector 125 (e.g., a ruggedized optical connector) that is received at an input port 132 of the splitter terminal 132.

In some implementations, the output cable 120 includes multiple optical fibers 123 that each optically coupled to one of the first and second optical lines that drop off at the indexing terminal 110. In an example, each optical fiber 123 is optically coupled to one of the dropped lines. In certain examples, the optical fibers 123 of the output cable 120 are separately terminated by ruggedized optical connectors 125 (e.g., DLX connectors) at the second end 122 of the output cable 120. In such implementations, less than all of the optical fibers 123 are routed to the splitter terminal 130. In the examples shown, the optical fiber 123 carrying the dropped first optical line $A_S$ and the optical fiber 123 carrying the dropped second optical line $B_1$ are routed to the splitter input ports 132.

In some examples, the output cable 120 includes a flexible service terminal (FST) 128 between the first and second ends 121, 122. In such examples, the portion of the output cable 120 extending between the first end 121 and the FST 128 includes multiple fibers enclosed within a jacket; the portion of the output cable 120 extending between the FST 128 and the second end 122 includes jacketed cable segments 124 each having one of the optical fibers 123. The FST 128 includes a flexible closure at the transition point between the first portion of the output cable 120 and the second portion of the output cable 120. In an example, each of the ruggedized optical connectors 125 terminating the dropped lines includes a single-fiber ruggedized optical connector (e.g., a DLX connector).

It will be appreciated that the network architecture is depicted schematically in FIG. 1 and that additional multi-fiber optical connectors (e.g., ruggedized connectors) can be added into the architecture. Additionally, single fiber optical ports, such as ruggedized fiber optic adapters, can be provided at the drop ports of the indexing terminals. Moreover, various indexing terminals can be strung serially together in a daisy chain to form the architecture. In the depicted embodiment, the multi-fiber optical connectors are 12-fiber optical connectors. In other examples, the multi-fiber optical connectors can include at least 4, 6, 8, 12, 24 or more optical fibers.

In use, the cable arrangement 102 is deployed by installing the indexing terminals 110 at desired locations in the field. In certain examples, the indexing terminals 110 are pre-cabled at the factory before being deployed. Accordingly, the indexing terminals utilize plug-and-play connections in the field.

In some examples, each indexing terminal 110 is associated with a multi-fiber cable 104. To connect an indexing terminal 110 to the network 100, the optical connector 105 of the associated cable 104 is routed to an adjacent indexing terminal 110 or other network equipment. In an example, the first optical connector 105 is robustly fastened at a ruggedized external port of an optical adapter disposed at the second cable port 114 of the adjacent indexing terminal 110. The optical adapter aligns the optical fibers of the connector 105 to the optical fibers of the connector 115 received at the internal port of the adjacent terminal. Likewise, the first optical connector 105 of a subsequent indexing terminal 110 can be robustly fastened at a ruggedized external port of the optical adapter disposed at the second cable port 114 of the indexing terminal 110.

In other examples, a ruggedized optical adapter having a ruggedized external port is also disposed at the first cable port 112. In such examples, non-indexed multi-fiber cables can be routed between the first cable port 112 of an indexing terminal and the second cable port 114 of a previous indexing terminal in the network.

In certain implementations, one or more of the dropped optical lines can be routed to the splitter terminal 130 using a plug-and-play connection. For example, a multi-fiber connector terminating the first end 121 of an output cable 120 can be received at the third cable port 116 of the indexing terminal 110. For example, a ruggedized multi-fiber connector can be robustly fastened to a ruggedized external port of an optical adapter disposed at the third cable port 116. The optical adapter aligns the optical fibers of the output cable 120 to the dropped optical fibers received at the interior port. Accordingly, optical signals carried over the dropped optical lines are carried over the optical fibers 123 of the output cable 120. One or more ends 122 of the output cable 120 can be routed to one or more splitter terminals 130 as described above.

In certain implementations, fewer than all of the optical fibers 123 of the output cable 120 are routed to the splitter terminal 130. In some examples, one or more of the optical fibers 123 can be used in point-to-point (PTP) connections between a subscriber and a central office. A PTP connection provides unsplit signals between the central office and a subscriber. Unsplit signals provide higher bandwidth to the subscriber. Accordingly, PTP connections are useful for connecting to a Distributed Antenna System (DAS), a WIFI network, a camera (e.g., security camera, traffic camera, etc.), a traffic light, or any other subscriber.

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:

1. A cable arrangement comprising:
    a first multi-fiber optical connector having a first row of sequential fiber positions and a second row of sequential fiber positions;
    a second multi-fiber optical connector having a first row of sequential fiber positions and a second row of sequential fiber positions;
    a first ribbon of optical fibers having first ends terminated at the sequential fiber positions of the first row of the first multi-fiber optical connector, the optical fibers of the first ribbon including a drop fiber having a second end routed to a drop connection interface, the optical fibers of the first ribbon also including indexed fibers having second ends indexed at the sequential fiber positions of the first row of the second multi-fiber optical connector; and
    a second ribbon of optical fibers having first ends terminated at the sequential fiber positions of the second row of the first multi-fiber optical connector, at least some of the optical fibers of the second ribbon having second ends terminated at the second multi-fiber optical connector.

2. The cable arrangement of claim 1, wherein the second end of the drop fiber is terminated at a plug connector.

3. The cable arrangement of claim 2, wherein the plug connector includes a multi-fiber plug connector.

4. The cable arrangement of claim 1, wherein the drop fiber is one of a plurality of drop fibers of the first ribbon of optical fibers.

5. The cable arrangement of claim 4, wherein each of the drop fibers has a respective second end routed to the drop connection interface.

6. The cable arrangement of claim 5, wherein the second end of each of the drop fibers is terminated at a multi-fiber connector received at the drop connection interface.

7. The cable arrangement of claim 1, wherein the indexed fibers are first indexed fibers; and wherein the at least some of the optical fibers of the second ribbon are second indexed fibers having second ends indexed at a second row of the second multi-fiber optical connector.

8. The cable arrangement of claim 1, wherein the second ribbon of optical fibers also includes a second drop fiber having a second end routed away from the second multi-fiber optical connector.

9. The cable arrangement of claim 8, wherein the second drop fiber is one of a plurality of second drop fibers of the second ribbon of optical fibers.

10. The cable arrangement of claim 8, wherein the second end of the second drop fiber is routed to the drop connection interface.

11. The cable arrangement of claim 10, further comprising a reverse drop fiber having one end terminated at the second multi-fiber optical connector and an opposite end routed away from the first multi-fiber optical connector.

12. The cable arrangement of claim 8, wherein the second indexed fibers are indexed separately from the first indexed fibers.

13. The cable arrangement of claim 12, further comprising a terminal that carries the drop connection interface.

14. The cable arrangement of claim 13, wherein the terminal carries the second multi-fiber optical connector at a port so that the second multi-fiber optical connector is optically accessible from an exterior of the terminal.

15. The cable arrangement of claim 14, wherein the first and second ribbons are included within a multi-fiber cable that extends from the terminal so that the first multi-fiber optical connector is distal from the terminal.

16. The cable arrangement of claim 1, further comprising a terminal that carries the drop connection interface.

17. The cable arrangement of claim 16, wherein the terminal carries the second multi-fiber optical connector at a port so that the second multi-fiber optical connector is optically accessible from an exterior of the terminal.

18. The cable arrangement of claim 16, wherein the first and second ribbons are included within a multi-fiber cable that extends from the terminal so that the first multi-fiber optical connector is distal from the terminal.

19. The cable arrangement of claim 1, further comprising a reverse drop fiber having one end terminated at the second multi-fiber optical connector and an opposite end routed away from the first multi-fiber optical connector.

20. The cable arrangement of claim 19, wherein the opposite end of the reverse drop fiber is terminated at the drop connection interface.

* * * * *